US006415418B1

(12) United States Patent
McLaughlin et al.

(10) Patent No.: US 6,415,418 B1
(45) Date of Patent: Jul. 2, 2002

(54) SYSTEM AND METHOD FOR DISSEMINATING FUNCTIONAL BLOCKS TO AN ON-LINE REDUNDANT CONTROLLER

(75) Inventors: Paul F. McLaughlin, Hatfield; Norman R. Swanson, Doylestown; Brian R. Reynolds, Philadelphia, all of PA (US); Markku K. Väätäinen, Kuvansi; Pekka M. Salpakari, Varkaus, both of (FI)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/384,507

(22) Filed: Aug. 27, 1999

(51) Int. Cl.[7] ............................................... G06F 17/50
(52) U.S. Cl. ............................................................ 716/3
(58) Field of Search ................................ 700/17; 716/3, 716/5

(56) References Cited

U.S. PATENT DOCUMENTS 5,359,730 A   10/1994   Marron 5,812,394 A * 9/1998 Lewis ........................ 700/17
5,852,735 A   12/1998 Urban

FOREIGN PATENT DOCUMENTS

| DE | 41 34207 C | 4/1993 |
| WO | WO 98 57259 A | 12/1998 |
| WO | WO 99 32969 A | 7/1999 |

* cited by examiner

Primary Examiner—Nathan J. Flynn
Assistant Examiner—Thuan Do
(74) Attorney, Agent, or Firm—Hitt Gaines & Boisbrun

(57) ABSTRACT

A system for, and method of, disseminating a functional block to a redundant controller for a real-time process control system and a real-time process control system incorporating the system or the method. In one embodiment, the system includes: (1) a dynamically linkable library object associable with the functional block and (2) a shared memory, associated with at least two nodes of the redundant controller, that receives the dynamically linkable library object and the functional block and provides concurrent access thereto by both the at least two nodes to ensure consistent memory images therefore without requiring one of the at least two nodes to be taken off-line.

24 Claims, 5 Drawing Sheets

SYSTEM AND METHOD FOR DISSEMINATING FUNCTIONAL BLOCKS TO AN ON-LINE REDUNDANT CONTROLLER

TECHNICAL FIELD OF THE INVENTION

The present invention is directed, in general, to real-time process control systems and, more specifically, to a system and method for disseminating functional blocks to an on-line redundant controller of a real-time process control system.

BACKGROUND OF THE INVENTION

Real-time process control systems were first implemented within a single computer system. As the need to monitor and control more physical devices increased, the complexity and size of the process control systems also increased. With this increased complexity and size came the problem of computer system failures. Computer system failures not only caused downtime, but also included the loss of monitoring and collecting data for that area of the real-time process control system. designated the primary computer at a given time and the other computer is designated the backup computer. If the primary computer failed to operate properly, the backup computer took over the functions of the primary computer.

The primary computer transferred the real-time process control data to the backup computer at regular intervals. This kept the backup computer up-to-date in case the backup computer was required to assume the status of primary computer. However, not all information could be transferred while both computers were on-line.

Information that could not be transferred on-line included control applications. Control applications consisted of a static set of control algorithms ("static function blocks") and/or a dynamic set of control algorithms ("dynamic function blocks") associated with the controller. Static function blocks are associated with the control routines and control definitions contained within the personality of the controller. Dynamic function blocks are associated with the control routines and control definitions contained within the dynamically linked library objects. The static and dynamic function blocks also included information that was related to the control devices associated with the real-time process control system.

The dynamically linked. library objects included process control routines and control definitions used to control devices attached to the real-time process control system. In other types of operating systems, the dynamically linked library object are called shared libraries.

To modify or add to the existing control routines and control definitions on both computers required several steps. First, the backup computer was taken off-line. The personality and/or dynamically linked library objects were updated on the off-line computer. Next, the off-line computer was brought on-line and was designated the primary computer. Then, the other computer was taken off-line. The personality and/or the dynamically linked library objects were updated on the off-line computer. Then, the computer was brought back on-line as the backup computer.

However, this procedure left the redundant computer system vulnerable. If the primary computer failed while the other computer was off-line, the real-time process control data would be lost and the devices could not be controlled until the other computer was brought back on-line. This seriously compromised the integrity and operation of the real-time process control system as a whole.

Therefore, what is needed in the art is an improved way to transfer information, such as dynamically linked library objects and static and dynamic functional blocks, between redundant computers while both computers are on-line.

SUMMARY OF THE INVENTION

To address the above-discussed deficiencies of the prior art, the present invention provides a system for, and method of, disseminating a functional block to a redundant controller for a real-time process control system and a real-time process control system incorporating the system or the method. In one embodiment, the system includes: (1) a dynamically linkable library (perhaps DLL) object associable with the functional block and (2) a shared memory, associated with at least two nodes of the redundant controller, that receives the dynamically linkable library object and the functional block and provides concurrent access thereto by both the at least two nodes to ensure consistent memory images therefore without requiring one of the at least two nodes to be taken off-line.

The present invention therefore introduces the broad concept of employing dynamically linkable library objects in combination with shared memory to provide a functional block and dynamically linkable library objects to at least two nodes of a redundant controller without requiring any of the at least two nodes to be taken off-line. Thus, the present invention allows new and/or modified control routines and definitions to be accessible or transferred between at least two nodes of a redundant controller without requiring any of the at least two nodes to be taken off-line.

In one embodiment of the present invention, the shared memory is a logical shared memory. Alternatively, the shared memory may be a physical shared memory. In an embodiment to be illustrated and described, the system further includes a controller redundancy synchronization mechanism (CRSM), coupled to the shared memory, that governs consistency between the memory images. The CRSM ensures that the memory of one node matches the memory of the other node, at least to the extent of the shared memory area.

In one embodiment of the present invention, the functional block is a part of a functional class. Those skilled in the pertinent art are familiar with the concept of objects and object classes. The present invention advantageously operates within the is environment of object-oriented programming to lend flexibility to the architecture of control software.

In one embodiment of the present invention, one of the at least two nodes is designated a primary node at a given point in time. Any remaining nodes are designated secondary nodes. Of course, the designations may change over time.

In one embodiment of the present invention, the dynamically linkable library object is registrable with respect to an operating system governing operation of the at least two nodes. Those skilled in the pertinent art are familiar with the process and objectives of registration.

In one embodiment of the present invention, the dynamically linkable library object is synchronized at a selected one of predetermined points-in-execution. The present invention preferably ensures consistency between multiple memory images by ensuring that the memory images at predesignated points-in execution are identical. Of course, consistency can be more rigorous, requiring identity at all shared memory locations.

In one embodiment of the present invention, the functional block is a type selected from the group consisting of (1) a static functional block, and (2) a dynamic functional block. In other embodiments of the present invention, the functional block can be other types that allow additional information associated with a real-time process control system to be accessible between the nodes of a redundant controller.

In one embodiment of the present invention, the functional block is uninstallable on each of the at least two nodes while the redundant controller is on-line. The present invention allows functional blocks that are unused, or for some other reason, to be uninstalled on each of the redundant controller's nodes thus saving space and execution time on the redundant controller's node.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
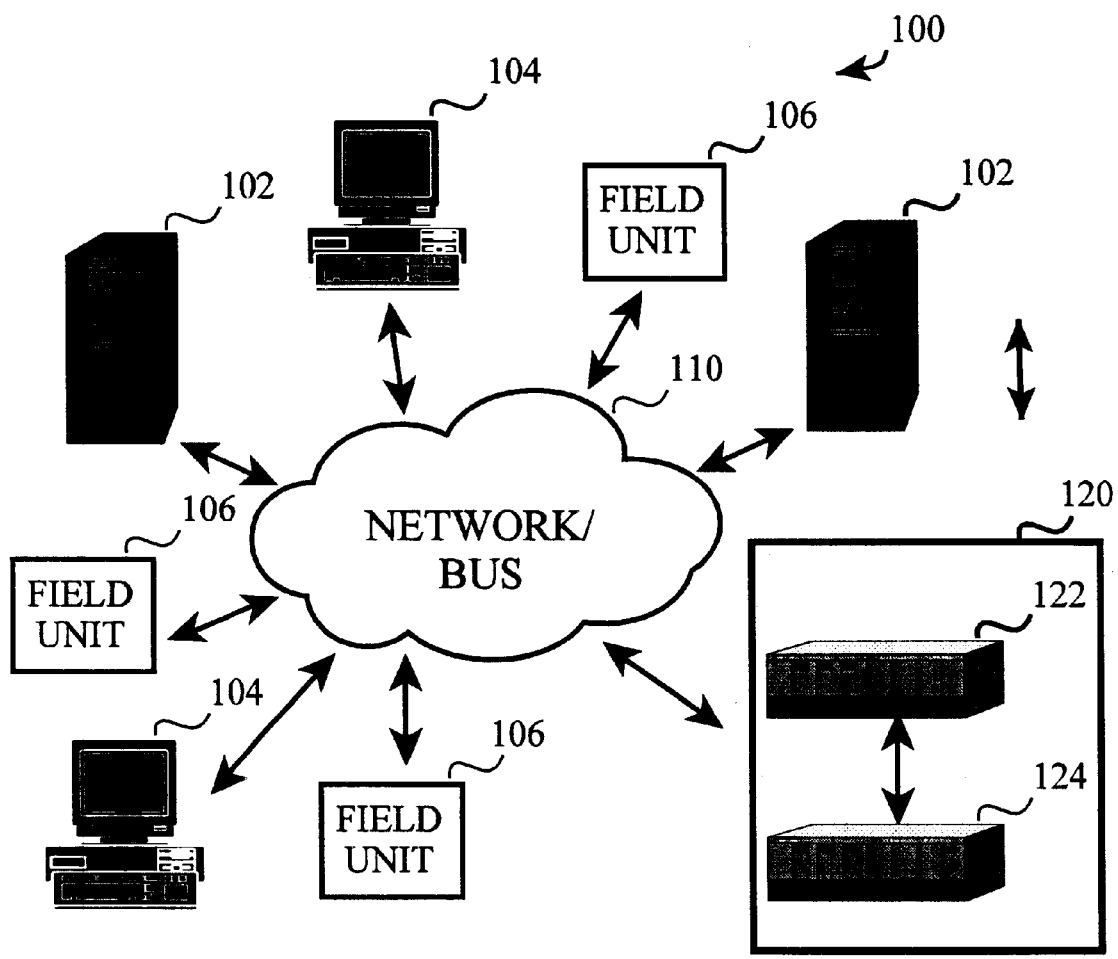
FIG. 1 illustrates a block diagram of a real-time process control system that forms one environment within which the present invention can operate.

Referring initially to FIG. 1, illustrated is a block diagram of a real-time process control system, generally designated 100, that forms one environment within which the present invention can operate. The real-time process control system 100 comprises one or more network/bus 110 that interconnects a server 102, an operator interface 104, a field unit 106 and a redundant controller 120. In the illustrated embodiment of the present invention, the real-time process control system 100 may comprise any number of servers 102, operator interfaces 104, field units 106 and redundant controllers 120.

The network/bus 110 comprises an industry standard network and industry standard network protocols. The industry standard network protocols, in one embodiment of the present invention, are ETHERNET® and Transmission Control Protocol/Internet Protocol ("TCP/IP"). In an alternate embodiment of the present invention, the network/bus 110 comprises proprietary network and proprietary network protocols. In a third embodiment of the present invention, the network/bus 110 may comprise a combination of industry standard and proprietary networks and network protocols. Wireless communications and fiber optic media may also be used for all or part of the network communications.

The server 102 comprises software programs that monitor, process information, and control the physical devices within the real-time process control system 100. The software programs comprise a requesting program "client," and a resource program "supplier" and other miscellaneous programs. The client program sends requests to supplier programs to perform specific functions. The supplier programs receive requests and perform the appropriate functions based upon the type of requests sent. The client programs and supplier programs communicate over the network/bus 110 or internally within the server 102.

The operator interface 104 comprises a computer and a display. The operator interface 104 displays information concerning the current state of the system 100. The operator interface 104 also accepts operator input to perform functions such as controlling a physical device or requesting other information to be displayed on the operator interface's 104 display. The operator interface 104 may comprise both client programs and supplier programs. The operator interface 104 communicates to other programs over the network/bus 110.

The field unit 106 comprises supplier programs that perform tasks related to the physical devices that make up the real-time process control system 100. In one embodiment of the present invention, the field unit's supplier programs collect status information, process data and control the physical devices. In other embodiments, the field unit 106 may perform more or fewer functions than described above. The field unit 106 responds to client's requests over the network/bus 110.

The redundant controller 120 comprises a primary node 122 and a backup node 124. In the redundant controller 120, if the primary node 122 fails to operate correctly, the backup node 124 assumes the role of the primary node and takes over the primary's nodes functions. In an alternate embodiment, the redundant controller 120 may comprise more than two nodes.

Each of the redundant controller's nodes comprise programs that perform specific tasks such as collecting status information, processing data and controlling physical devices. Both the primary node 122 and the backup node 124 respond to client's requests over the network/bus 110. Also, the primary node 122 is coupled to the backup node 124 via a redundancy link through which the nodes share information.

Figure 2:
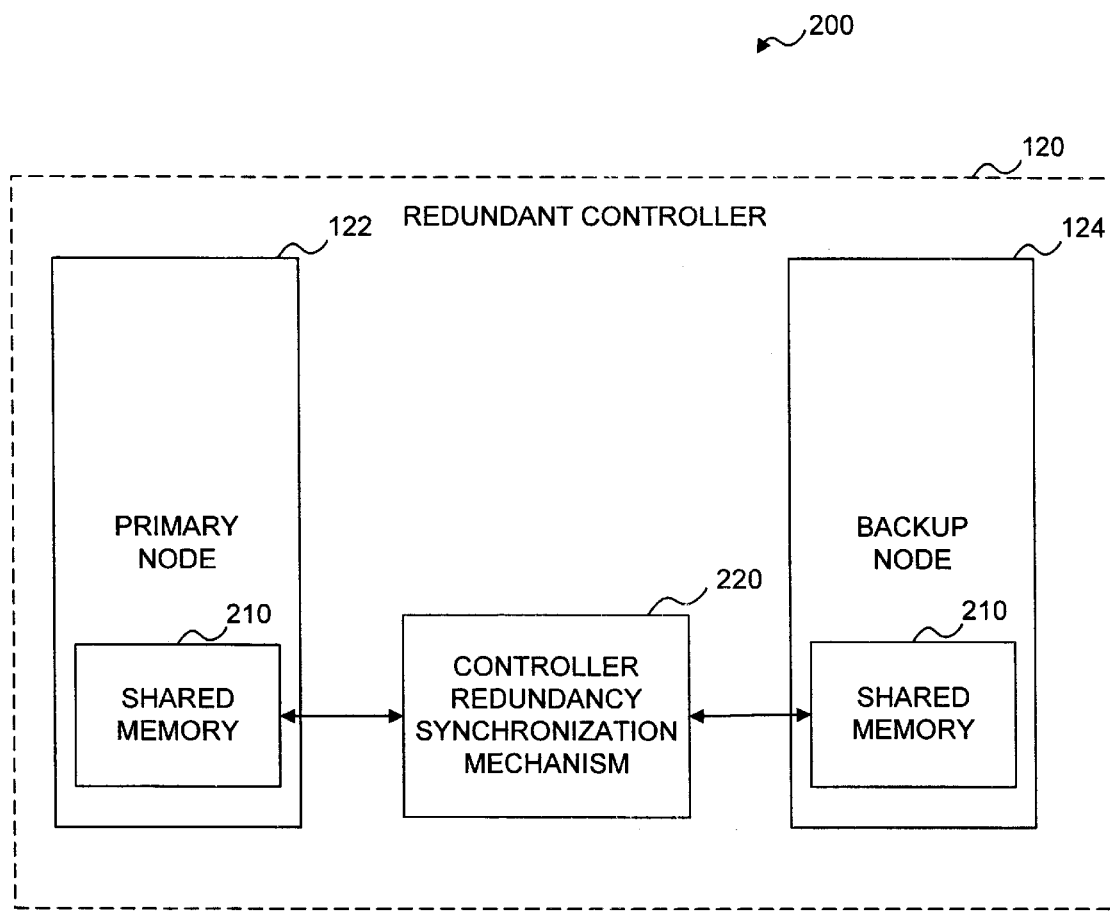
FIG. 2 illustrates a block diagram of the redundant controller of FIG. 1 constructed according to the principles of the present invention.

Referring now to FIG. 2, illustrated is a block diagram of the redundant controller 120 of FIG. 1 constructed according to the principles of the present invention. In one embodiment of the present invention, the redundant controller 120 has at least two nodes, the primary node 122 and the backup node 124. The primary node 122 and the backup node 124 are coupled to the shared memory 210. In the illustrated embodiment of the present invention, the shared memory 210 is logical shared memory and is located in each node of the redundant controller 120. Even though the shared memory is shown located in each node, the concept of using memory that is shared between each of the nodes of the redundant controller 120 is not limited by the location or the number of nodes illustrated in FIG. 2. In an alternate embodiment, the shared memory 210 is physical shared memory.

Coupled to the shared memory 210 is a controller redundancy synchronization mechanism ("CRSM") 220. The CRSM 220 governs the consistency between the memory images in the primary node 122 and the backup node 124 and is conventional. The CRSM 220 also ensures that the memory of one node matches the memory of the other node, at least to the extent of the shared memory area. In ensuring the consistency of memory images, the CRSM 220 will synchronize the memory images at predetermined point-in-execution. A "predetermined point-in-execution" is a point common to both the primary node's and backup node's execution where synchronization of memory can be performed. The predetermined point-in-execution points ensure that each node is using the same information prior to performing certain functions.

One skilled in the art should know that the present invention is not limited to a redundant controller with only two nodes. In another embodiment of the present invention, the redundant controller may have more than two nodes and the shared memory is coupled between all the nodes. Also, other embodiments of the present invention may have more capabilities than described above.

Figure 3:
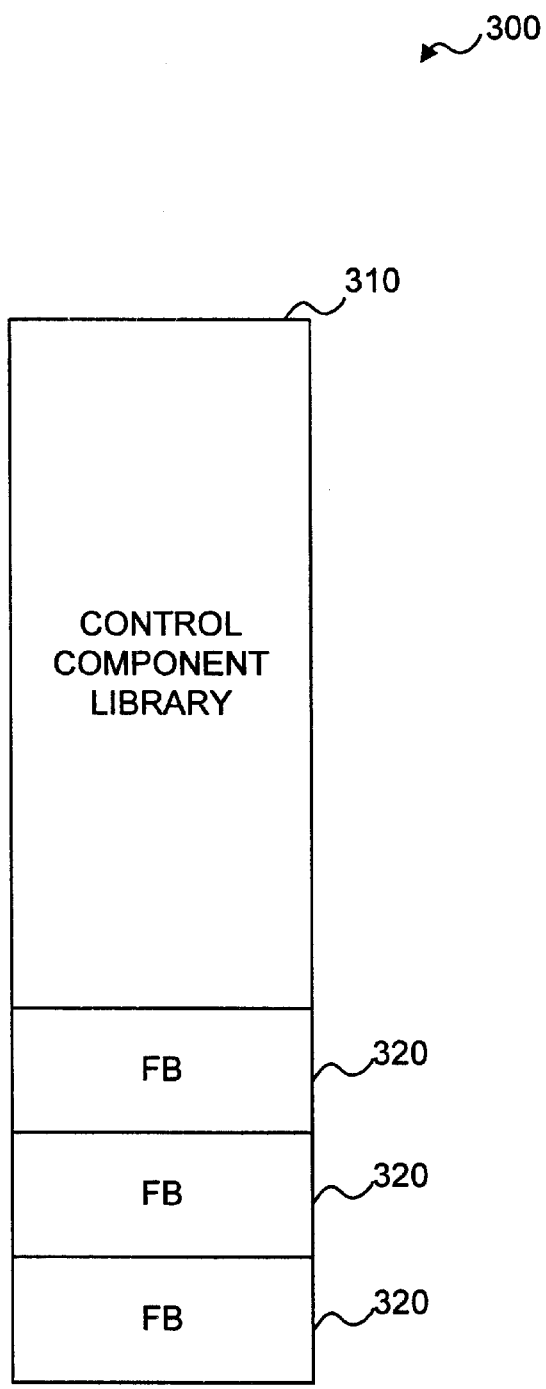
FIG. 3 illustrates a block diagram of a Control Component Library associable with function blocks used by the redundant controller of FIG. 2 constructed according to the principles of the present invention.

Referring now to FIG. 3, illustrated is a block diagram of a Control Component Library ("CCL") 310 associable with function blocks 320 used by the redundant controller of FIG. 2 constructed according to the principles of the present invention. CCLs are specialized Dynamically Linked Library ("DLL") objects for control functions used within the real-time process control system 100. CCLs are loaded into shared memory 210 on the primary controller 122 and transferred to the shared memory 210 on the backup controller 124 by the CRSM 220. CCLs are also registrable and unregistrable with respect to the operating systems governing the operation of the redundant controller 120. Those skilled in the pertinent art are familiar with the concept and use of DLL objects, registration of DLLs and control functions.

Associable with the CCL 310 are function blocks 320. The function blocks 320 comprise information concerning processing of sensors, controllable devices or other components within the real-time process control system 100. The function blocks 320 are instantiated into shared memory 210 and also contain and/or reference pointers into a CCL object's control functions. In one embodiment of the present invention, the function blocks 320 are objects that are part of a functional class. In another embodiment of the present invention, each of the instantiated function blocks 320 can be either a static or a dynamic function block. Those skilled in the pertinent art are familiar with the concept of objects, object classes and function blocks and their use in real-time process control system.

The redundant controller's primary node 122 and backup node 124 both use and maintain the CCL 310 and the associable function blocks 320. In an alternate embodiment of the present invention, the primary node 122 uses the CCL 310 and the backup node 124 does not use the CCL 310 until the backup node 124 transitions into the primary role.

The CRSM 220 synchronizes the CCL 310 and the associable function blocks 320 between the primary node 122 and the backup node 124. In one embodiment of the present invention, the instantiated functional blocks 320 and the CCL 310 must reside in the same logical shared memory location on both the primary node 122 and the backup node 124 since the functional blocks 320 contain and/or reference pointers into the CCL 310. In a second embodiment of the present invention, each of instantiated function blocks 320 can be located anywhere in shared memory.

In one embodiment of the present invention, the CCL 310 can be uninstalled on the primary node 122 and the backup node 124 while they are on-line. A CCL may be uninstalled when the CCL is no longer referenced by a function block. In other embodiments of the present invention, other criteria for determining when to uninstall an associable function block may be used. In a second embodiment of the present invention, the function blocks 320 can be uninstalled on the primary node 122 and the backup node 124 while they are on-line.

One skilled in the art should know that the present invention is not limited to the three function blocks and the one CCL described. In another embodiment of the present invention, the there can be more than three or fewer function blocks associable with a CCL. In a third embodiment of the present invention, the function blocks may be contained within the CCL.

Figure 4:
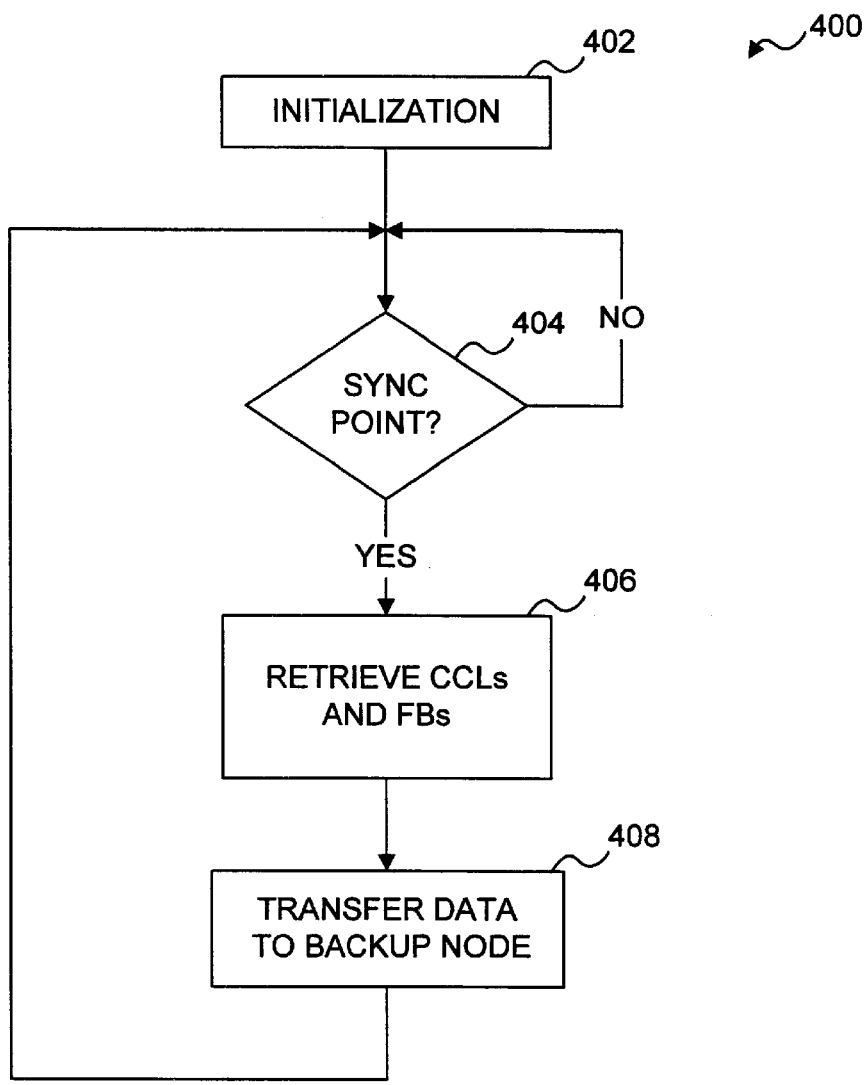
FIG. 4 illustrates a flow diagram of a method of the primary node synchronizing the CCL and the associated function blocks of FIG. 3 to the backup node of the redundant controller of FIG. 2.

Referring now to FIG. 4, illustrated is a flow diagram of a method of the primary node 122 synchronizing the CCL and the associated function blocks of FIG. 3 to the backup node 124 of the redundant controller of FIG. 2. In FIG. 4, the CRSM 220 first performs initialization in a step 402.

After initialization, the CRSM 220 examines the execution of the primary node 122 for a point-in-execution synchronization point in a decisional step 404. If the primary node 122 has not reached a point-in-execution synchronization point, the CRSM 220 returns to determine if a point-in-execution synchronization point has been reached in the decisional step 404.

If the CRSM 220 determines that a point-in-execution synchronization point has been reached by the primary node 122, the CRSM 220 retrieves the CCLs 310 and the associable function blocks 320 that are associated with this particular point-in-execution synchronization point from shared memory in a step 406.

Next, the CRSM 220 transfers the CCLs 310 and the associable function blocks 320 from the primary node 122 to the backup node 124 in a step 408. Once the CRSM 220 has transferred the CCLs 310 and the associable function blocks 320 to the backup node 124, the CRSM 220 then returns to examine the primary node 122 execution for the next point-in-execution synchronization point in the decisional step 404.

In another embodiment of the present invention, the CRSM 220 also transfers information from the primary node 122 to the backup node 124 that allows unused or not-in-use CCLs 310 to be uninstalled on the backup node 124. In a third embodiment of the present invention, the CRSM 220 transfers also transfers information that allows the CCLs 310 to be uninstalled on the backup node 124 based upon predetermined criteria.

Figure 5:
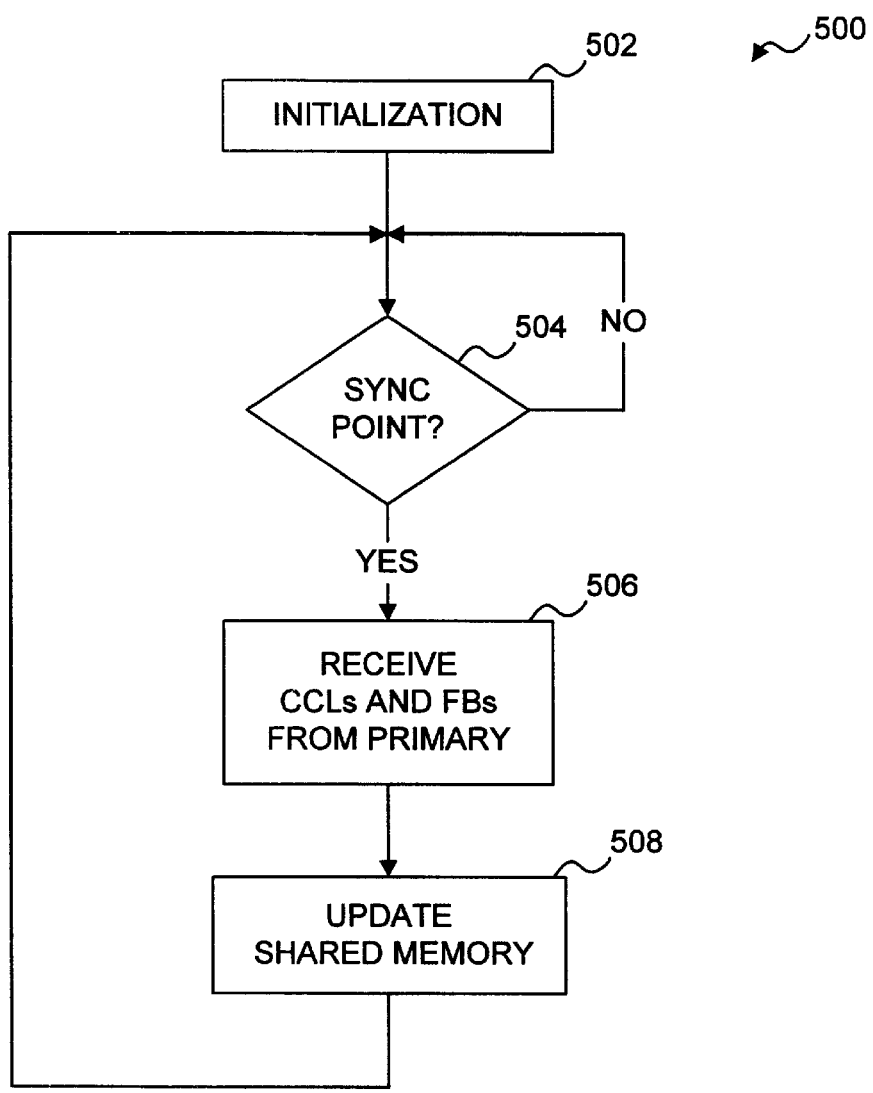
FIG. 5 illustrates a flow diagram of a method of the backup node of the redundant controller of FIG. 2 receiving synchronization data from the primary node.

Referring now to FIG. 5, illustrated is a flow diagram of a method of the backup node 124 of the redundant controller of FIG. 2 receiving synchronization data from the primary node 122. In FIG. 5, the CRSM 220 first performs initialization in a step 502.

After initialization, the CRSM 220 examines the execution of the backup node 124 for a point-in-execution synchronization point in a decisional step 504. If the backup node 124 has not reached a point-in-execution synchronization point, the CRSM 220 returns to determine if a point-in-execution synchronization point has been reached in the decisional step 504.

If the CRSM 220 determines that a point-in-execution synchronization point has been reached by the backup node 124, the CRSM 220 receives the synchronization data from the primary node 122 in a step 506. In one embodiment of the present invention, the synchronization data comprises the CCLs 310 and the associable function blocks 320. In another embodiment of the present invention, the synchronization data can comprise other information in addition to the CCLs 310 and the associable function blocks 320.

Next, the CRSM 220 updates the backup node's shared memory with the synchronization data in a step 508. The update process may include registering the transferred CCLs 310 and the associable function blocks 320 with the operating system if needed. The update processes may also include instantiating the function blocks 320 in shared memory. In another embodiment of the present invention, the backup node 124 also saves the synchronization data to a local storage device associated with the backup node 124. Once the backup node 124 has received the synchronization data, the CRSM 220 then returns to examine the backup node 124 execution for the next point-in-execution synchronization point in the decisional step 504.

In another embodiment of the present invention, the backup node 124 receives information from the primary node 122 to uninstall one or more CCLs 310. Once this type of information is received, the CRSM 220 uninstalls the specified associable function of blocks 320 on the backup node 124. In a third embodiment of the present invention, the backup node 124 receives and processes uninstall CCLs 310 commands.

One skilled in the art should know that the present invention is not limited to transferring information from the primary node to the backup node. In another embodiment of the present invention, the synchronization of node information can occur in both directions. In a second embodiment of the present invention, any one of the redundant controller's nodes may perform the synchronization of information between the nodes. Also, the present invention is not limited to only synchronizing CCLs and function blocks between nodes. Other embodiments of the present invention may have additional or fewer steps than described above in FIG. 4 and FIG. 5.

Although the present invention has been described in detail, those skilled in the art should understand that they can make various changes, substitutions and alterations herein without departing from the spirit and scope of the invention in its broadest form.

What is claimed is:

1. A system for disseminating a functional block to a redundant controller for a real-time process control system, comprising:
   a dynamically linkable library object associable with said functional block; and
   a shared memory, associated with at least two nodes of said redundant controller, that receives said dynamically linkable library object and said functional block and provides concurrent access thereto by both said at least two nodes to ensure consistent memory images therefore without requiring one of said at least two nodes to be taken off-line.

2. The system as recited in claim 1 wherein said shared memory is a logical shared memory.

3. The system as recited in claim 1 further comprising a controller redundancy synchronization mechanism, coupled to said shared memory, that governs consistency between said memory images.

4. The system as recited in claim 1 wherein said functional block is a part of a functional class.

5. The system as recited in claim 1 wherein said dynamically linkable library object is registrable with respect to an operating system associated with each of said at least two nodes and governing operation of each of said at least two nodes.

6. The system as recited in claim 1 wherein said dynamically linkable library object is synchronized at a selected one of predetermined points-in-execution.

7. The system as recited in claim 1 wherein said functional block is a type selected from the group consisting of:
   a static functional block, and
   a dynamic functional block.

8. The system as recited in claim 1 wherein said dynamically linkable library object is uninstallable on each of said at least two nodes while said redundant controller is on-line.

9. A method of disseminating a functional block to a redundant controller for a real-time process control system, comprising:
   associating said functional block with a dynamically linkable library object; and
   providing said dynamically linkable library object and said functional block to a shared memory associated with at least two nodes of said redundant controller; and
   providing, with said shared memory, concurrent access to said dynamically linkable library object and said functional block by both said at least two nodes to ensure consistent memory images therefore without requiring one of said at least two nodes to be taken off-line.

10. The method as recited in claim 9 wherein said shared memory is a logical shared memory.

11. The method as recited in claim 9 further comprising governing consistency between said memory images with a controller redundancy synchronization mechanism coupled to said shared memory.

12. The method as recited in claim 9 wherein said functional block is a part of a functional class.

13. The method as recited in claim 9 further comprising registering said dynamically linkable library object with respect to an operating system associated with each of said at least two nodes and governing operation of each of said at least two nodes.

14. The method as recited in claim 9 further comprising linking said dynamically linkable library object at a selected one of predetermined points-in-execution.

15. The method as recited in claim 9 wherein said functional block is a type selected from the group consisting of:
   a static functional block, and
   a dynamic functional block.

16. The method as recited in claim 9 further comprising uninstalling said dynamically linkable library object on each of said at least two nodes while said redundant controller is on-line.

17. A real-time process control system, comprising:
   a plurality of sensors and controllable devices;
   a bus, coupled to said plurality of sensors and controllable devices;
   a redundant controller, coupled to said bus, and having at least two nodes; and
   a system for disseminating a functional block to said redundant controller, including:
      a dynamically linkable library object associable with said functional block, and shared memory, associated with said at least two nodes, that receives said dynamically linkable library object and said functional block and provides concurrent access thereto by both said at least two nodes to ensure consistent memory images therefore without requiring one of said at least two nodes to be taken off-line.

18. The real-time process control system as recited in claim 17 wherein said shared memory is a logical shared memory.

19. The real-time process control system as recited in claim 17 further comprising a controller redundancy synchronization mechanism, coupled to said shared memory, that governs consistency between said memory images.

20. The real-time process control system as recited in claim 17 wherein said functional block is a part of a functional class.

21. The real-time process control system as recited in claim 17 wherein said dynamically linkable library object is registrable with respect to an operating system associated with each of said at least two nodes and governing operation of each of said at least two nodes.

22. The real-time process control system as recited in claim 17 wherein said dynamically linkable library object is synchronized at a selected one of predetermined points-in-execution.

23. The real-time process control system as recited in claim 17 wherein said functional block is a type selected from the group consisting of:

a static functional block, and a dynamic functional block.

24. The real-time process control system as recited in claim 17 wherein said dynamically linkable library object is uninstallable on each of said. at least two nodes while said redundant controller is on-line.

* * * * *

UNITED STATES PATENT AND TRADEMARK OFFICE
CERTIFICATE OF CORRECTION

PATENT NO.    : 6,415,418 B1
DATED         : July 2, 2002
INVENTOR(S)   : McLaughlin et al.

It is certified that error appears in the above-identified patent and that said Letters Patent is hereby corrected as shown below:

Column 7,
Line 60, "therefore" should read -- therefor --.
Line 61, after "off-line", add the following:
-- ; wherein one of said at least two nodes is designated a primary node at a given point in time --.

Column 8,
Line 30, "therefore" should read -- therefor --.
Line 31, after "off-line", add the following:
-- ; wherein one of said at least two nodes is designated a primary node at a given point in time --.

Column 9,
Line 1, before "shared memory", add -- a --.
Line 5, "therefore" should read -- therefor --.
Line 7, after "off-line", add the following:
-- ; wherein one of said at least two nodes is designated a primary node at a given point in time --.

Signed and Sealed this

Fifteenth Day of October, 2002

*Attest:*

*Attesting Officer*

JAMES E. ROGAN
*Director of the United States Patent and Trademark Office*